Dec. 19, 1961 W. R. KING 3,013,785
DRYER TEMPERATURE CONTROLS
Filed March 24, 1958
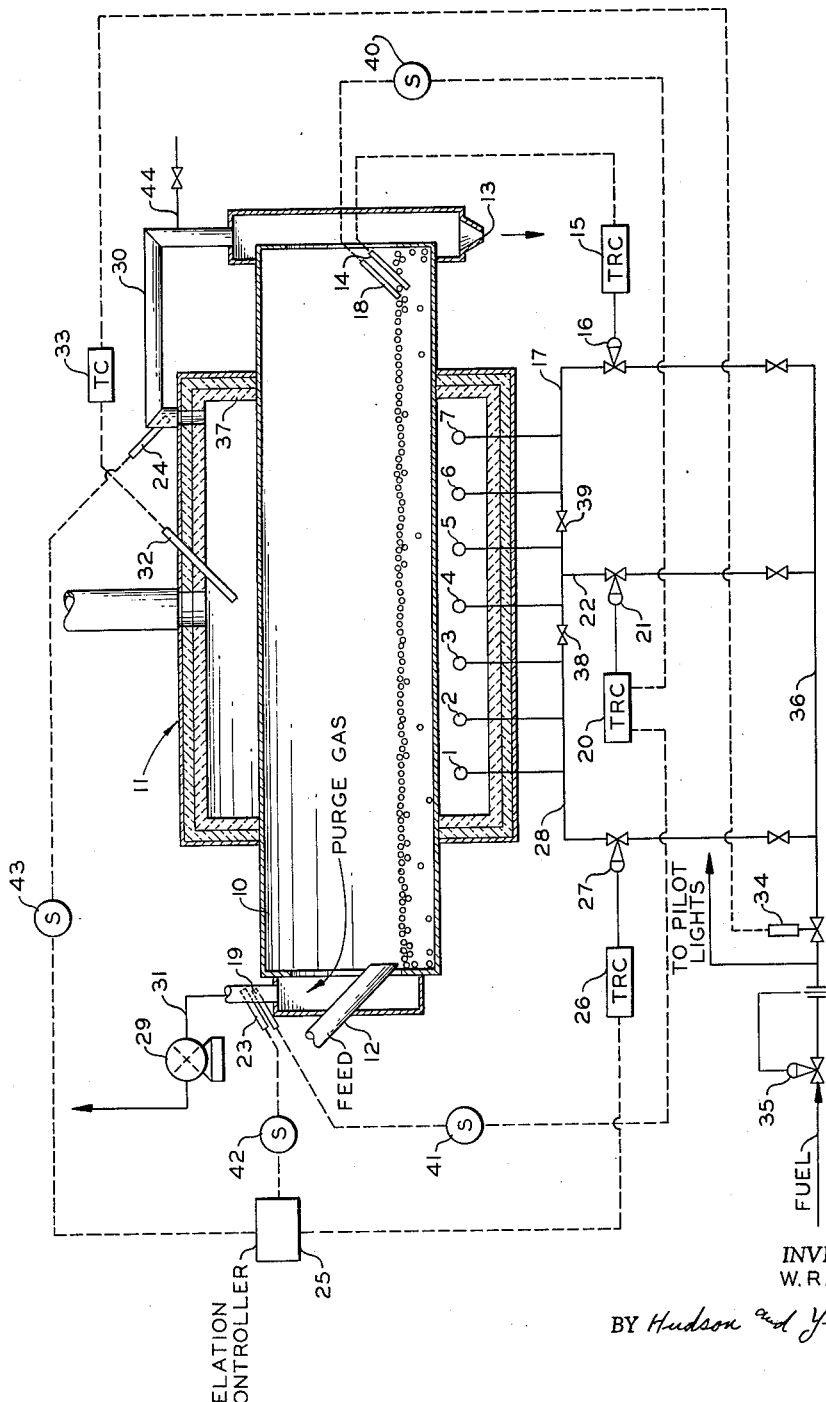
INVENTOR.
W. R. KING
BY Hudson and Young
ATTORNEYS

United States Patent Office 3,013,785
Patented Dec. 19, 1961

3,013,785
DRYER TEMPERATURE CONTROLS
William R. King, Borger, Tex., assignor to Phillips Petroleum Company, a corporation of Delaware
Filed Mar. 24, 1958, Ser. No. 723,274
3 Claims. (Cl. 263—33)

This invention relates to drayers and to a system for controlling the temperature therein. In one aspect the invention relates to a temperature control system for use in a rotary dryer wherein a granular material such as carbon black pellets is dried.

Rotary dryers are known for the drying of granular material and comprise a drum rotating within a furnace and tilted from the horizontal so that the granular material traverses the longitudinal length of the drum as it is tumbled by the rotary action of the drum. A plurality of burners located in the furnace beneath the rotating drum provides the heat for drying the granular material and usually a portion of the combustion gases from the furnace are passed through the rotating drum as purge gas to carry out the released moisture. The usual method of controlling the firing of a rotary dryer is to determine the outlet product temperature and to regulate all of the burners in proportion to that temperature. The dryer usually demands more heat at the feed inlet end and this demand is usually filled by placing more burners at the feed inlet end.

This method of control is not entirely satisfactory because the temperature sensing point being at the outlet end is exposed to a time lag equal to the time required for the granular material to traverse the dryer. The action of the controller is often required to attempt the correction of a change which is detected only after the entire dryer has been filled with the material of changed characteristics, for example, overly wet granular material.

It is an object of this invention to provide an improved temperature control system for a rotary dryer being used to dry granular material. It is also an object of this invention to provide a temperature control system for a rotary dryer which will control the amount of heat supplied to the dryer in accordance with the load placed upon the dryer. A further object of this invention is the provision of a temperature control arrangement which will give maximum dryer throughput with close control of outlet temperature so as to prevent oxidation of carbon black pellets being dried in the rotary dryer. Other and further objects and advantages will be apparent to one skilled in the art upon studying this disclosure, including the detailed description and the appended drawing.

The accompanying drawing is a diagrammatic sectional view of a system embodying the invention and adapted for carrying out the method of the invention.

Broadly the invention contemplates the simultaneous control of the temperature of the outlet end portion of a dryer; control of the temperature of the material inlet end portion of the dryer according to the difference of the purge gas inlet and outlet temperatures; and control of the temperature of the central portion of the dryer according to the average of the inlet and outlet end portions of the dryer. This is accomplished by utilizing separate banks of burners for the portions of the dryer to be separately controlled and by controlling each bank of burners as described above. Commercially available recording controller instruments are employed.

Referring now to the drawing, dryer drum 10 is rotatably positioned in furnace 11 and is heated by burners 1, 2, 3, 4, 5, 6 and 7. The wet feed is introduced at 12 and the dried granular material is removed at 13. A temperature sensitive means such as indicated by thermocouple 14 is positioned in contact with the granular material leaving the dryer and is connected to a temperature controller recorder 15 which controls motor valve 16 in the fuel line 17 which in turn supplies fuel to burners 6 and 7 so as to maintain the temperature of the granular material leaving the dryer within a predetermined range. Thermocouple 18, also in contact with the granular material leaving the dryer, and thermocouple 19 in contact with the wet purge gas leaving the dryer 10 are connected in parallel to temperature controller recorder 20 so as to indicate the average temperature of these two thermocouples and temperature controller recorder 20 is connected to motor valve 21 in fuel line 22 so as to control the flow of fuel to burners 4 and 5 and maintain the average temperature of thermocouples 18 and 19 within a predetermined range. Thermocouple 23, also in contact with the purge gas leaving dryer drum 10, and thermocouple 24, in contact with the purge gas entering dryer drum 10, are connected to relation controller 25 which in turn is connected to temperature controller recorder 26 so as to operate motor valve 27 in fuel line 28, which supplies fuel to burners 1, 2 and 3 so as to maintain the temperature difference between thermocouples 23 and 24 within a predetermined temperature range. Blower 29 draws hot combustion gases from furnace 11 via conduit 30 through drum 10 and exhausts the combustion gases via conduit 31. Thermocouple 32, in contact with the combustion gases in furnace 11, is connected to electric temperature controller 33, which in turn is connected to normally closed electric valve 34. Pressure regulator 35 maintains substantially constant fuel pressure in line 36. The furnace 11 contains conventional refractory lining indicated at 37.

Controller 25 maintains a predetermined temperature difference between the inlet and outlet purge gas; controller 20 maintains average of the purge gas leaving the dryer and the dried granular material leaving the dryer within a predetermined range; and recorder 15 maintains the absolute temperature of the granular material leaving the dryer within a predetermined range. Controller 33 maintains normally closed valve 34 in open position so long as the temperature in furnace 11 does not exceed a predetermined value and so long as the electric power supply to the plant is maintained. Electric operated valve 34 is a manual re-set valve so that in case the valve is closed as a result of excessive temperature in furnace 11 or as a result of an electric power failure the valve must be re-opened manually in order to re-start the drying operation.

The controllers which are used in carrying out the present invention are commercially available; for example, controller 25 can be a Foxboro model 40 relation controller shown on page 55 of Bulletin 450 obtained from the Foxboro Company, Foxboro, Mass.; controller 33 can be the electric controller shown on page 60 of the above bulletin, and electric valve 34 can be the electric valve shown on page 79 of the above bulletin.

The system of this invention utilizes the quick response of the purge gas to temperature changes within the dryer drum coupled with the average of the exit purge gas and the dried product to provide the proper temperature within the dryer drum coupled with the absolute temperature of the dried granular material leaving the drum so as to avoid overheating of the material in the dryer.

When the control system of this invention is applied to a rotary dryer used to dry carbon black pellets, a marked increase in the amount of pellets dried per unit of time is realized together with substantial elimination of oxidation of carbon black as a result of unduly high outlet temperatures, sometimes required when operating according to the prior art. Substantially completely dry carbon black pellets can be obtained by the method of the invention.

The system has been described with valves 38 and 39 closed so that burners 1, 2, and 3 form one bank; burners 4 and 5 form a separate bank; and burners 6 and 7 form still another separate bank. Switches 40, 41, 42 and 43 are closed. If desired, switch 43 can be opened so that the first bank of burners comprising burners 1, 2 and 3 are operated in accordance with the outlet purge gas temperature; alternatively switch 40 can be opened so that the center bank of burners comprising burners 4 and 5 are operated in accordance with the temperature of the purge gas outlet. Another mode of operation comprises opening valve 38 and disconnecting controller 20 so that controller 26 operates a bank of burners 1 to 5, inclusive; alternatively valve 39 can be opened instead of valve 38 so that burners 4 to 7, inclusive, are operated as a bank by controller 15. Air can be added to the purge gas through conduit 44 if desired. A blower (not shown) will ordinarily be used to provide a supply of air. Thus it can be seen that the control system of the present invention provides a flexible and efficient means for controlling the drying of granular material in a rotary dryer and has particular utility in drying materials which are temperature sensitive.

Variations and modifications are possible within the scope of the present disclosure without departing from the spirit and scope of the invention.

That which is claimed is:

1. For use in a rotary dryer comprising, in combination, a furnace, a dryer drum positioned substantially horizontally within said furnace, a feed inlet and a purge gas outlet in the first end of said dryer drum, a product outlet and purge gas inlet in the second end of said dryer drum, and conduit means communicating with the interior of said furnace and said purge gas outlet, apparatus comprising first burner means within the furnace in heating relationship with the first end of said drum; second burner means within the furnace in heating relationship with the second end of said drum; third burner means within the furnace in heating relationship with said drum intermediate said first and second burner means; means to pass fuel to said burner means; means responsive to the inlet and outlet purge gas temperatures to measure the difference between the inlet and outlet purge gas temperatures and to increase the fuel supply to the first burner means when the difference between the inlet and outlet purge gas temperatures exceeds a predetermined value and to reduce the fuel supply when the difference is less than said predetermined value; means responsive to the outlet purge gas temperature and the temperature of the dried material being discharged from said drum to measure the average of the outlet purge gas and dried material temperatures, to increase the fuel supply to the third burner means when said average is less than a predetermined value, and to reduce the fuel supply when said average exceeds said predetermined value; means responsive to the temperature of the dried material being discharged from said drum to increase the fuel supply to the second burner means when the temperature of the dried material being discharged from said drum is less than a predetermined value and to reduce the fuel supply when the temperature exceeds said predetermined value; and means responsive to the furnace combustion products temperature to terminate the fuel supply to all of said burner means when the combustion products temperature exceeds a predetermined value.

2. For use in a rotary dryer comprising, in combination, a furnace, a dryer drum positioned substantially horizontally within said furnace, a feed inlet and a purge gas outlet in the first end of said drum, a product outlet and purge gas inlet in the second end of said drum and conduit means communicating with the interior of said furnace and said purge gas outlet, apparatus comprising first burner means within the furnace in heating relationship with said first end of said drum; second burner means within the furnace in heating relationship with the second end of said drum; means responsive to the inlet and outlet purge gas temperatures to increase the fuel supply to the first burner means when the difference between the inlet and outlet purge gas temperatures exceeds a predetermined value and to reduce the fuel supply when the difference is less than said predetermined value; and means responsive to the temperature of the dried material being discharged from said drum to increase the fuel supply to the second burner means when the temperature of the dried material being discharged from said drum is less than a predetermined value and to reduce the fuel supply when the temperature exceeds said predetermined value.

3. For use in a rotary dryer comprising, in combination, a furnace, a dryer drum positioned substantialy horizontally within said furnace, a feed inlet and a purge gas outlet in the first end of said drum, a product outlet and purge gas inlet in the second end of said drum, and conduit means communicating with the interior of said furnace and said purge gas outlet, apparatus comprising first burner means within the furnace in heating relationship with said first end of said drum; second burner means within the furnace in heating relationship with the second end of said drum; means responsive to the outlet purge gas temperature to reduce the fuel supply to the first burner means when the outlet purge gas temperature exceeds a predetermined value and to increase the fuel supply when the temperature is less than said predetermined value so as to maintain the outlet purge gas temperature at a substantially constant value; and means responsive to the temperature of the dried material being discharged from said drum to increase the fuel supply to the second burner means when the temperature of the dried material being discharged from said drum is less than a predetermined value and to reduce the fuel supply when the temperature exceeds said predetermined value.

References Cited in the file of this patent

UNITED STATES PATENTS

| | | |
|---|---|---|
| 2,033,169 | Zeun | Mar. 10, 1936 |
| 2,068,574 | Smith | Jan. 19, 1937 |
| 2,122,037 | Lissauer | June 28, 1938 |
| 2,484,594 | Spangenberg | Oct. 11, 1949 |